July 16, 1957 R. A. FINDLAY 2,799,677
PURIFICATION OF ALKENYLPYRIDINES
Filed Oct. 13, 1955 2 Sheets-Sheet 1

INVENTOR.
R. A. FINDLAY
BY Hudson and Young
ATTORNEYS

July 16, 1957   R. A. FINDLAY   2,799,677
PURIFICATION OF ALKENYLPYRIDINES
Filed Oct. 13, 1955   2 Sheets-Sheet 2

INVENTOR.
R. A. FINDLAY
BY Hudson and Young
ATTORNEYS

United States Patent Office 2,799,677
Patented July 16, 1957

2,799,677

PURIFICATION OF ALKENYLPYRIDINES

Robert A. Findlay, Bartlesville, Okla., assignor to Phillips Petroleum Company, a corporation of Delaware Application October 13, 1955, Serial No. 540,208

8 Claims. (Cl. 260—290)

This invention relates to the purification of alkenylpyridines. In another aspect this invention relates to the separation and purification of alkenylpyridines from a mixture of alkenylpyridines and alkylpyridines. In another aspect this invention relates to the separation and purification of a vinylsubstituted pyridine from a mixture of the vinyl-substituted pyridine and the corresponding ethylpyridine. In a preferred embodiment, this invention relates to the separation and purification 2-methyl-5-vinylpyridine from a mixture of 2-methyl-5-vinylpyridine and 2-methyl-5-ethylpyridine.

The production of alkenylpyridines, especially vinylpyridines, has recently become of much industrial importance. Vinylpyridines can be prepared by the condensation of formaldehyde with 2-, 4-, and 6-methyl substituted alkylpyridines to form monoethylol pyridines followed by dehydration of same by heating to produce corresponding vinylpyridines or substituted vinylpyridines. A more direct procedure, and one which is probably the most important industrially, is the direct catalytic dehydrogenation of alkylpyridines to the corresponding alkenylpyridines. Thus, for example, 2-methyl-5-ethylpyridine can be efficiently dehydrogenated to produce the corresponding 2-methyl-5-vinylpyridine. This can be done, for example, by passing an admixture of from 2 to 15 weights of steam per weight of 2-methyl-5-ethylpyridine, at a temperature within the range of 1000 to 1300° F., at approximately atmospheric pressure, and a space velocity of 1 to 5 liquid volumes 2-methyl-5-ethylpyridine charged per volume of catalyst per hour, over a catalyst, exemplified by one composed of 93 percent iron oxide, 5 percent chromium oxide, and 2 percent potassium hydroxide, as described in further detail in the copending application of John E. Mahan, Serial No. 244,469, filed August 30, 1951. The dehydrogenation effluent contains in addition to hydrogen, principally unchanged 2-methyl-5-ethylpyridine and 2-methyl-5-vinylpyridine product. Also present are small quantities of pyridine, 2-picoline, 3-picoline, 2,5-lutidine, 3-ethylpyridine and 3-vinylpyridine.

Purification of vinylpyridines contained in mixtures produced by the above described processes or other mixtures presents many difficulties. These arise because of the great ease with which vinylpyridines polymerize, the closeness of boiling points between vinylpyridine and their corresponding ethylpyridines, and the formation of water azeotropes and other difficultly separable fractions on fractional distillation of such mixtures. The process of this invention operates free of the difficulties from polymerization which are encountered in purification of vinylpyridines by fractional distillation as discussed by R L. Frank et al., I. E. C. 40, 879.

An object of this invention is to purify alkenylpyridines.

Another object of this invention is to separate and purify alkenylpyridines from admixture with alkylpyridines.

Another object of the invention is to purify vinylpyridines.

A further object is to separate an alkenylpyridine from admixture with the corresponding alkylpyridine.

Yet another object is to effect the separation and purification referred to above while minimizing polymerization of the alkenylpyridines.

A still further object is to purify 2-methyl-5-vinylpyridine. Further objects and advantages of the invention will be apparent to one skilled in the art from the accompanying disclosure and drawing wherein.

The present application is a continuation-in-part of Serial No. 361,230, filed June 12, 1953, now Patent No. 2,731,468.

Serial No. 361,230 discloses a process for the purification of alkenylpyridines such as the separation and purification of alkenylpyridines from the corresponding alkylpyridines by subjecting an admixture of same to fractional crystallization, using anhydrous ammonia as an internal refrigerant. An internal refrigerant is one which is introduced directly into the material to be refrigerated and in the above-referred to application anhydrous ammonia is introduced directly into the admixture of alkenylpyridines and corresponding alkylpyridines and produces refrigeration when said admixture is introduced to a zone of reduced pressure so as to flash the ammonia therefrom.

Broadly, the present invention is directed to a method for the separation and purification of alkenylpyridines from an admixture of same with the corresponding alkylpyridines by subjecting the admixture to solvent extraction with aqueous ammonia, which, due to the greater solubility of alkenyl pyridines in the aqueous ammonia, produces an extract which is enriched in said alkenyl pyridines. The extraction is preferably carried out in a continuous countercurrent liquid-liquid solvent extraction zone adapted to provide a plurality of stages. Methods and apparatus for obtaining intimate contact of two at least partially immiscible liquids are well known to the art and therefore a detailed description of such is not required.

An important feature of using aqueous ammonia for the solvent in the solvent extraction method for separating alkenylpyridines from the corresponding alkylpyridines is due to the fact that ammonia has the attribute of retarding polymer formation in the alkenylpyridines.

The concentration of ammonia in the aqueous ammonia solvent can be from 50 to 90 weight percent ammonia. It is preferred to maintain the ammonia concentration in a range between 65 and 85 weight percent.

The temperature can be in the range of 40 to 110° F. The pressure employed is that necessary to maintain the ammonia in solution in the aqueous ammonia solvent.

The ratio of solvent to feed can be in the range of 17:1 to 35:1 and is preferably maintained in the range 20:1 to 30:1.

The reflux ratio can vary from 6.5:1 to total reflux, and is preferably 7:1 to 12:1. The ratios are on a weight basis.

The proportions of the alkenylpyridines and alkylpyridines present in the admixture to be separated can vary widely. A preferred embodiment of my invention treats the effluent from the dehydrogenation of 2-methyl-5-ethylpyridine to produce 2-methyl-5-vinylpyridine and this effluent is a mixture containing principally about 30 to 40 percent by weight of 2-methyl-5-vinylpridine, about 60 to 70 percent by weight of 2-methyl-5-ethylpyridine and small quantities of pyridine, 2-picoline, 3-picoline, 2,5-lutidine, 3-ethylpyridine and 3-vinylpyridine.

Figure 1:
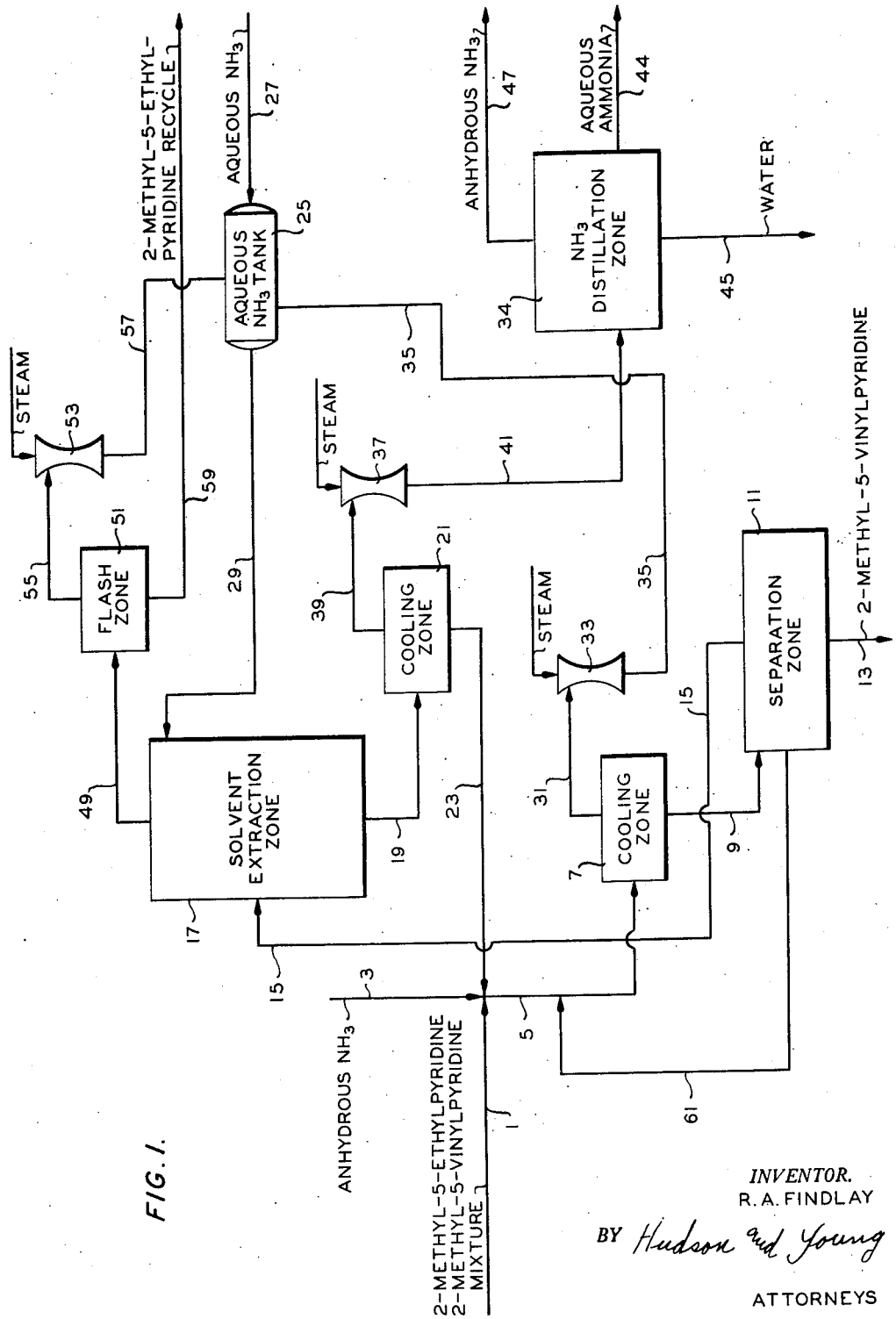
Figure 1 illustrates one embodiment of the invention incorporated with a crystallization process.

In the accompanying drawing Figure 1 shows diagrammatically one arrangement of apparatus elements and flow of materials therethrough suitable for practicing my invention in one modification wherein the solvent extraction is combined with crystallization. Various auxiliary items of equipment such as valves, pumps, etc., can be supplied by those skilled in the art and therefore have not been shown. It will be apparent that numerous modifications can be made of the specific details shown without departing from the invention.

An admixture of 2-methyl-5-vinylpyridine and 2-methyl-5-ethylpyridine to be separated and from which it is desired to recover purified 2-methyl-5-vinylpyridine is introduced via line 1 and anhydrous ammonia is introduced to the said admixture via line 3. The admixture containing anhydrous ammonia as an internal refrigerant is passed via line 5 to flash zone 7, a zone of reduced pressure which chills said admixture to form a crystal magma. The crystal magma from flash zone 7 is passed via line 9 to the separation zone 11 wherein the 2-methyl-5-vinylpyridine crystals are separated from the resulting mother liquor. Occluded mother liquor is washed free from the crystals and purified 2-methyl-5-vinylpyridine is withdrawn from the separation zone 11 via line 13. The mother liquor from the separation zone 11 is passed via line 15 to solvent extraction zone 17, where liquid-liquid contacting with the aqueous ammonia solvent in countercurrent flow produces an extract rich in the 2-methyl-5-vinylpyridine. The extract is passed via line 19 to flash zone 21 where said extract is subjected to conditions of reduced pressure thereby chilling said extract to near but above its freezing temperature. The chilled extract is passed via line 23 back to the admixture of 2-methyl-5-vinylpyridine and 2-methyl-5-ethylpyridine, thereby enriching said admixture in 2-methyl-5-vinylpyridine.

The solvent for the extraction process is the aqueous ammonia made up in aqueous ammonia tank 25 to which is added ammonia via line 27 and ammonia-containing water via lines 35 and 57. The aqueous ammonia is passed from tank 25 to the solvent extraction zone 17 via line 29.

The condition of reduced pressure for flash zone 7 is produced by a steam jet 33, in aspirating relation thereto, which flashes ammonia from said admixture via line 31 and the ammonia-containing water therefrom is passed via line 35 to the aqueous ammonia tank 25.

The condition of reduced pressure for flash zone 21 is produced by a steam jet 37, in aspirating relation thereto, which removes ammonia from the extract produced by the solvent extraction zone 17 via line 39 from flash zone 21 and the ammonia-containing water therefrom is passed via line 41 to an ammonia distillation zone 43.

The ammonia distillation zone 43 provides for the production of anhydrous ammonia which is taken overhead via line 47 and aqueous ammonia which is taken off via line 44. Water is removed from the ammonia distillation zone via line 45. The anhydrous ammonia can be recycled to this process where needed, e. g., to be added to the admixture of 2-methyl-5-vinylpyridine and 2-methyl-5-ethylpyridine. Similarly, the aqueous ammonia can be recycled to the solvent extraction zone, or elsewhere in the process, as required.

The raffinate from the solvent extraction zone 17, which is rich in 2-methyl-5-ethylpyridine, is withdrawn from solvent extraction zone 17 via line 49 and passed to flash zone 51. A condition of reduced pressure is produced in flash zone 51 by a steam jet 53 which removes ammonia from the raffinate via line 55 and the ammonia-containing water therefrom is passed via line 57 to the aqueous ammonia tank 25. 2-methyl-5-ethylpyridine is withdrawn from flash zone 51 via line 59 to be recycled to the purification process, herein disclosed, or to the dehydrogenation process, as desired.

Figure 2:
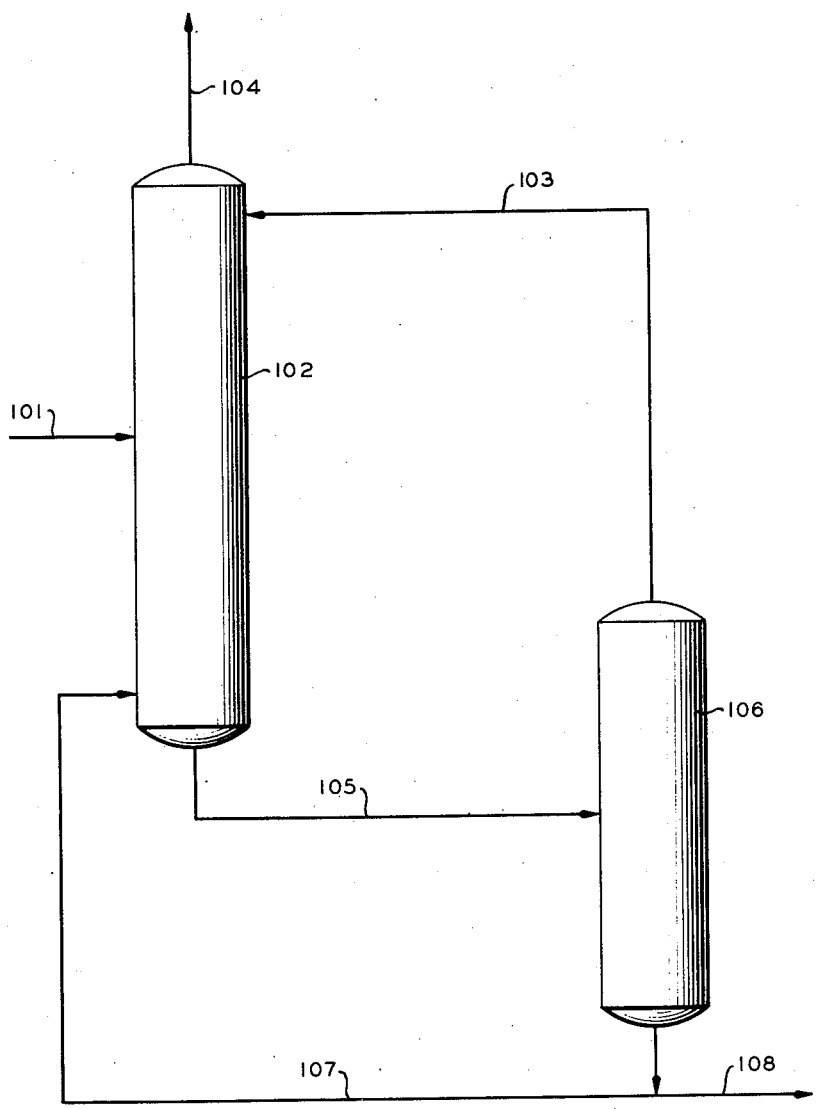
Figure 2 illustrates a preferred embodiment of the invention.

Reference is made now to a preferred embodiment of the invention shown in Figure 2 wherein the feed stream containing 2-methyl-5-vinylpyridine and 2-methyl-5-ethyl- pyridine is introduced by way of line 101 to countercurrent liquid-liquid extraction column 102 and aqueous ammonia is admitted by way of line 103 to the top portion of said column. The raffinate comprising a stream rich in 2-methyl-5-ethylpyridine is removed from the top of column 102 by way of line 104 as a product of the process and can be passed to a dehydrogenation step so as to produce additional 2-methyl-5-vinylpyridine. The extract, which comprises aqueous ammonia having dissolved therein compounds composed principally of 2-methyl-5-vinylpyridine, is removed from column 102 by means of line 105 and passed to separation means 106, for example, a distillation column, wherein aqueous ammonia is removed as the overhead product and returned as the solvent to extraction column 102 by means of line 103. The 2-methyl-5-vinylpyridine rich hydrocarbon stream is removed from the bottom of separation means 106 and a portion of this stream is returned by way of line 107 to the bottom of column 102 as reflux. It is usually preferable to operate separation means 106 at a pressure below atmospheric so as to minimize polymerization of MVP in the kettle.

The following examples illustrate the process of this invention but are not to be construed so as to limit the invention.

*Example I*

A mixture consisting essentially of MEP (2-methyl-5-ethylpyridine) and MVP (2-methyl-5-vinylpyridine), in equal amounts by weight, is fed to a continuous countercurrent liquid-liquid extraction column at a rate of 100 lbs. per hour. Solvent consisting of ammonia containing 35 weight percent water is introduced at a point near the top of the column at a rate of 2450 lbs. per hour. An extract phase containing 17.5 weight percent pyridines is removed at a rate of 2971 lbs. per hour and passed to a fractionation system for the separation of pyridines from solvent. A reflux stream comprising a portion of the extract product is returned to the extraction column at a rate of 473 lbs. per hour. The remainder of the extract product is withdrawn from the system in the form of 98 percent MVP at a rate of 48 lbs. per hour. The raffinate product comprises 94.3 weight percent MEP at a rate of 52 lbs. per hour.

*Example II*

A mixture containing 50 weight percent MEP (2-methyl-5-pyridine) and 50 weight percent MVP (2-methyl-5-vinylpyridine) was extracted in a single stage extractor with ammonia containing 35 weight percent water at 110° F. The extract phase contained 9.0 weight percent pyridines, and the extract product contained 51.7 weight percent MVP on a solvent free basis.

This process of this invention is applicable to alkenylpyridines containing at least one alkenyl group having at least 2 carbon atoms, and in a preferred embodiment, to a separation and purification from alkylpyridines corresponding thereto. By "corresponding thereto" I mean alkylpyridines having the same number and molecular arrangement of carbon atoms. Di-, tri-, and tetraalkenylpyridines, with the alkenyl substituents being present in various positions on the pyridine nucleus and wherein the double bond can be in a vinyl group or in the alpha position of the various possible positions in carbon chains of three and more carbon atoms in length, can be separated from corresponding alkylpyridines. 2-methyl-5-vinylpyridine and 2-methyl-5-ethylpyridine make up one group which it is frequently desired to separate in accordance with this invention. Other examples of alkenylpyridines which can be separated and purified from admixture with alkylpyridines corresponding thereto in accordance with my invention are, 2-vinyl-4-ethylpyridine, 2-ethyl-4-vinylpyridine, 2-vinylpyridine, 3-Δ'-propenylpyridine and 2-Δ'-pentenylpyridine. Usually the process of my invention is applied to those alkyl and alkenyl pyridines containing a total of not over 10 carbon atoms in side chains and best results are customarily obtained with mixtures containing a monovinyl- or monopropenylpyridine and the corresponding ethyl or propylpyridine, with or without one or two methyl groups thereon.

Variations and modifications are possible within the scope of the disclosure of the invention, the essence of which is the discovery that aqueous ammonia can be used as a selective solvent for the separation of alkenylpyridines from a mixture of alkenylpyridines and alkylpyridines.

That which is claimed is:

1. A process for resolving a mixture of an alkenylpyridine and an alkylpyridine corresponding thereto, said alkenylpyridine having at least one alkenyl group with the double bond in the alpha position and having from two to ten carbon atoms in side chains, which comprises, contacting said mixture with aqueous ammonia so as to form an extract phase rich in alkenylpyridine and a raffinate phase rich in alkylpyridine; and recovering the alkenylpyridine from said extract phase.

2. A process for resolving a mixture of an alkenylpyridine and an alkylpyridine corresponding thereto, said alkenylpyridine having at least one alkenyl group with the double bond in the alpha position and having from two to ten carbon atoms in side chains, which comprises, passing a stream of said mixture into countercurrent contact with aqueous ammonia containing from about 50 to 90 weight percent ammonia at a temperature in the range about 40 to 110° F. and a pressure sufficient to maintain the ammonia in solution; recovering a raffinate phase from said contacting step; recovering an extract phase from said contacting step; recovering a stream rich in alkylpyridine from said raffinate as a product of the process; recovering a stream rich in alkenylpyridine from said extract as an additional product of the process; and returning aqueous ammonia to said contacting step.

3. A process for the separation and recovery of 2-methyl-5-vinylpyridine from a mixture containing about 30 to 40 weight percent 2-methyl-5-vinylpyridine and about 60 to 70 weight percent 2-methyl-5-ethylpyridine which comprises passing a stream of said mixture into countercurrent contact with about 17 to 35 pounds of solvent per pound of mixture of a solvent comprising aqueous ammonia containing from about 50 to 90 weight percent ammonia at a temperature in the range about 40 to 110° F.; recovering a raffinate phase from said contacting step; recovering an extract phase from said contacting step; passing said extract phase to a separation zone; removing aqueous ammonia from said extract phase in said separation zone; returning said aqueous ammonia to said contacting step; removing 2-methyl-5-vinylpyridine from said extract in said separation zone; returning at least 87 weight percent of said 2-methyl-5-vinylpyridine to said contacting step; and recovering the remaining 2-methyl-5-vinylpyridine as a product of the process.

4. A process for resolving a mixture of an alkenylpyridine and an alkylpyridine corresponding thereto, said alkenylpyridine having at least one alkenyl group with the double bond in the alpha position and having from two to ten carbon atoms in side chains, which comprises, contacting said mixture with aqueous ammonia so as to form an extract phase rich in alkenylpyridine and a raffinate phase rich in alkylpyridine.

5. A process for resolving a mixture of alkenylpyridine and an alkylpyridine corresponding thereto, said alkenylpyridine having at least one alkenyl group with the double bond in the alpha position and having from two to ten carbon atoms in side chains, which comprises, passing a stream of said mixture into countercurrent contact with aqueous ammonia containing from about 50 to 90 weight percent ammonia; recovering a raffinate phase from said contacting step; recovering an extract phase from said contacting step; recovering a stream rich in alkylpyridine from said raffinate as a product of the process; and recovering a stream rich in alkenylpyridine from said extract as an additional product of the process.

6. A process for resolving a mixture of an alkenylpyridine and an alkylpyridine corresponding thereto, said alkenylpyridine having at least one alkenyl group with the double bond in the alpha position and having from two to ten carbon atoms in side chains, which comprises, contacting said mixture with aqueous ammonia containing from about 50 to 90 weight percent ammonia so as to form an extract phase rich in alkenylpyridine and a raffinate phase rich in alkylpridine; and recovering the alkenylpyridine from said extract phase.

7. A process for resolving a mixture of an alkenylpyridine and an alkylpyridine corresponding thereto, said alkenylpyridine having at least one alkenyl group with the double bond in the alpha position and having from two to ten carbon atoms in side chains, which comprises, contacting said mixture with aqueous ammonia containing about 50 to 90 weight percent ammonia so as to form an extract phase rich in alkenylpyridine and a raffinate phase rich in alkylpyridine.

8. The process of claim 7 wherein the alkylpyridine is 2-methyl-5-ethylpyridine and the alkenylpyridine is 2-methyl-5-vinylpyridine.

No references cited.